(12) United States Patent
Binz Vallevik et al.

(10) Patent No.: US 11,677,544 B2
(45) Date of Patent: Jun. 13, 2023

(54) ENCRYPTION AND DECRYPTION OF MEDIA DATA

(71) Applicant: FLIR Unmanned Aerial Systems AS, Hvalstad (NO)

(72) Inventors: Gjert Binz Vallevik, Hvalstad (NO); Martin Korsgaard, Hvalstad (NO); Torgeir Grothe Lien, Hvalstad (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 88 days.

(21) Appl. No.: 16/846,242

(22) Filed: Apr. 10, 2020

(65) Prior Publication Data
US 2020/0244448 A1   Jul. 30, 2020

Related U.S. Application Data

(63) Continuation of application No. PCT/US2018/055721, filed on Oct. 12, 2018.

(30) Foreign Application Priority Data

Oct. 13, 2017 (NO) .................................... 20171641

(51) Int. Cl.
*H04L 9/08* (2006.01)
*B64C 39/02* (2023.01)
*H04L 9/06* (2006.01)
*H04N 7/167* (2011.01)

(52) U.S. Cl.
CPC .......... *H04L 9/0825* (2013.01); *B64C 39/024* (2013.01); *H04L 9/0631* (2013.01); *H04L 9/0863* (2013.01); *H04L 9/0894* (2013.01); *H04N 7/1675* (2013.01); *B64C 2201/00* (2013.01)

(58) Field of Classification Search
CPC ........................... G06F 21/602; G06F 21/6227
See application file for complete search history.

(56) References Cited

U.S. PATENT DOCUMENTS

| | | | |
|---|---|---|---|
| 2002/0124177 A1 | 9/2002 | Harper et al. | |
| 2003/0046572 A1 | 3/2003 | Ewman et al. | |
| 2012/0237028 A1* | 9/2012 | Khazan | H04W 56/0045 380/201 |
| 2014/0010371 A1 | 1/2014 | Khazan et al. | |
| 2015/0113279 A1 | 4/2015 | Andersen et al. | |
| 2015/0161410 A1 | 6/2015 | Andersen et al. | |
| 2017/0057634 A1 | 3/2017 | Hunt et al. | |
| 2017/0063531 A1 | 3/2017 | Sullivan | |

FOREIGN PATENT DOCUMENTS

| | | |
|---|---|---|
| CN | 105429759 | 3/2016 |
| CN | 106982208 | 7/2017 |
| CN | 107104948 | 8/2017 |
| EP | 3 229 445 | 10/2017 |
| WO | WO 2016/160593 | 10/2016 |

\* cited by examiner

*Primary Examiner* — Izunna Okeke
(74) *Attorney, Agent, or Firm* — Haynes and Boone, LLP

(57) ABSTRACT

The embodiments herein relate to encryption and decryption of media data transmitted between an Unmanned Aerial Vehicle (UAV) and a ground controlling base, when recording and playing back the media data by combining symmetric and asymmetric cryptography.

20 Claims, 4 Drawing Sheets

Playback of video

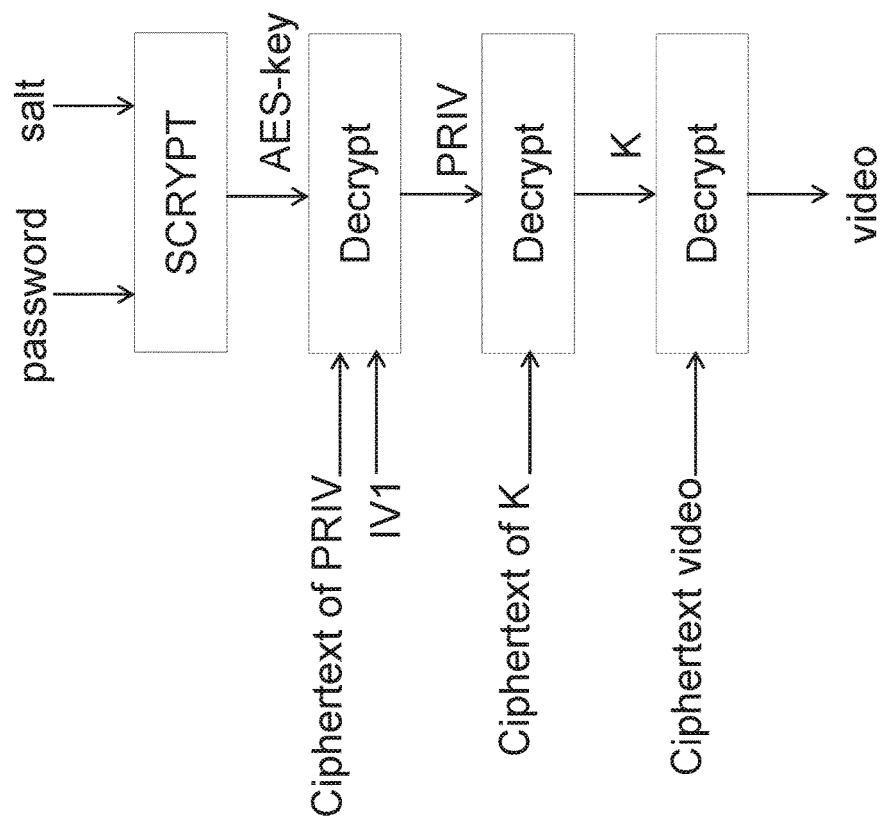

ENCRYPTION AND DECRYPTION OF MEDIA DATA

CROSS-REFERENCE TO OTHER RELATED APPLICATIONS

This application is a continuation of International Patent Application No. PCT/US2018/055721 filed Oct. 12, 2018 and entitled "ENCRYPTION AND DECRYPTION OF MEDIA DATA," which is incorporated herein by reference in its entirety.

International Patent Application No. PCT/US2018/055721 filed Oct. 12, 2018 claims priority to and the benefit of Norway Patent Application No. 20171641 filed Oct. 13, 2017 and entitled "ENCRYPTION AND DECRYPTION OF MEDIA DATA," which is hereby incorporated by reference in its entirety.

TECHNICAL FIELD

The present application relates to encryption of data transmitted between an Unmanned Aerial Vehicle (UAV) and a ground controlling base, and when stored on the ground controlling base.

BACKGROUND

Modern warfare and law enforcement are characterized by an increasing need for up-to-date situational awareness. To track down, or to protect against, criminals, paramilitary forces or terrorists, law enforcement personnel and soldiers often have an immediate need for information about what is around the next corner or over the hill.

Hostile forces frequently hide themselves from view or exploit the local terrain to gain tactical advantage or escape from pursuers. In the presence of hostile forces, a simple brick wall, barbed wire fence, a body of water, buildings or even a large open area can be an insurmountable obstacle when time is of the essence and tactical resources are unavailable. An active or undetected threat can make the situation dangerous.

Visible indications, noises or predictable actions can reveal friendly forces and put them at risk. Stealth and surprise, however, are important elements that can give a tactical advantage. An UAV is an aircraft with no pilot on board (Also referred to herein as NUAV, where N is an abbreviation for Nano). UAVs can be remotely controlled (e.g. flown by a pilot/operator at a remote ground control station using a controller) or it can fly autonomously based on pre-programmed flight plans or more complex dynamic automation systems. An UAV may also be referred to as a drone. UAVs equipped with video cameras and positioning devices transmit live pictures and positioning information to the operator of the UAV and allows their operator to perform surveillance tasks and gather information from a safe position without exposing themselves during mission.

Unmanned aerial systems, often referred as drones, are becoming largely popular among general public and businesses. The system includes the actual unmanned aerial system (UAS), the ground control station and the communication link between them. The data transmitted between the ground station and the UAS in both directions, as well as the data stored on the ground control station memory chips in the case of an illegitimate access to it, should not be easily available to a third party, and protected by encryption.

Implementation of an encryption solution for a UAV system has to balance user friendliness against required system security. An important requirement is to allow for encrypted data storage without requiring any password or other specific user actions in order to execute a mission (i.e. time critical actions), but instead require specific actions when reviewing data recorded during the mission.

SUMMARY

The present application includes a method of combining symmetric and asymmetric cryptography for recording and playing back a video media data stream, by the steps of generating a public key and a corresponding private key, password protecting the private key, generating a symmetric data encryption key, encrypting said symmetric data encryption key by means of the public key and said video media data stream by means of the symmetric data encryption key, decrypting the private key by means of the password, decrypting the said symmetric data encryption key by means of the private key, and decrypting said video media data stream by means of the symmetric data encryption key.

The present application also includes the encryption and decryption parts of the above described method separately, though interacting with each other in a key/key whole manner.

The present application also includes an UAV system, having the above mentioned method implemented.

BRIEF DESCRIPTION OF THE DRAWINGS

The following detailed description of the embodiments herein is accompanied by drawings in order to make it more readily understandable. In the drawings:

FIG. 4 illustrates an example of play back video according to the present application.

Figure 1:
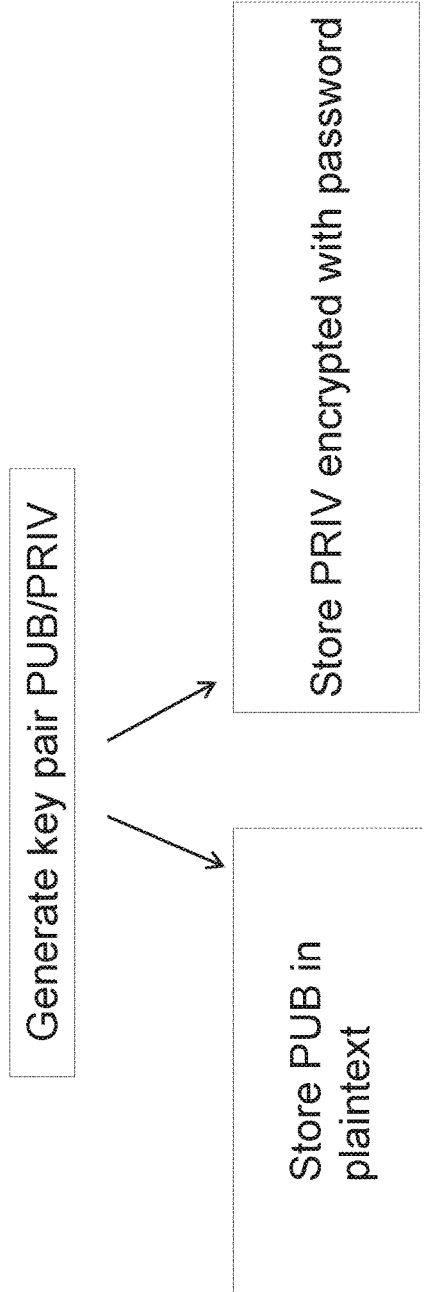
FIG. 1 illustrates an example of setting up a system according to the present application.

The drawings are not necessarily to scale and the dimensions of certain features may have been exaggerated for the sake of clarity. Symbols, video and pictures will usually be in colour. Emphasis is placed upon illustrating the principle of the embodiments herein.

DETAILED DESCRIPTION

In the following, the embodiments herein will be discussed and example embodiments described by referring to the accompanying drawings.

The present application relates to encryption of data transmitted between an Unmanned Aerial Vehicle (UAV) and a ground controlling base, and when stored on the ground controlling base.

Symmetric cryptography uses the same cryptographic keys for both encryption and decryption of data. The keys may be identical and often represent a shared secret between two or more parties that can be used to maintain a private information link.

Asymmetrical cryptography, is any cryptographic system that uses pairs of keys: Public keys which may be disseminated widely, and private keys which are known only to the owner. Data is encrypted by the public key, but only the holder of the paired private key can decrypt the data encrypted with the public key.

Because of the computational complexity of asymmetric encryption, it is usually used only for small blocks of data. The symmetric encryption/decryption is based on simpler algorithms and is much faster and less computational demanding.

In a public key encryption system, any person can encrypt data using the public key of the receiver, but such data can be decrypted only with the receiver's private key. For this to work it must be computationally feasible for a user to generate a public and private key-pair to be used for encryption and decryption. The strength of a public key cryptography system relies on the degree of difficulty for a properly generated private key to be determined from its corresponding public key. Security then depends only on keeping the private key private, and the public key may be published without compromising security.

According to embodiments herein, a combination of symmetric and asymmetric cryptography is used to balance user friendliness against required system security.

A public/private key pair is generated when a password is set in the ground control station. The public key may be stored in plaintext and is used as a key encryption key (KEK). Each time a mission is started, a data encryption key is generated (DEK), and the KEK is used to encrypt the DEK. Since the KEK is stored in plaintext, starting a mission will not require user input. The encrypted DEK (E-DEK) is stored together with the encrypted data.

Using the public key as key encryption key, means that the private key may be used as the key decryption key (KDK). The password is put into a password-based key derivation function (KDF) to produce a key for encrypting the KDK. The encrypted KDK may be stored on the ground control station together with the E-DEK and the encrypted data.

To decrypt and view the stored data, the user needs to enter the password. The password is entered into the KDF, thus producing the key that is able to decrypt the KDK. The KDK is then used to decrypt the DEK, which again is used to decrypt the data.

FIGS. 1-4 illustrate an example embodiment of the present application.

Referring to FIG. 1, when setting up a system according to the example embodiment, a public and private key-pair is generated. The public key is stored in plain text in the ground control station, while the private key is encrypted by a password before being stored.

Figure 2:
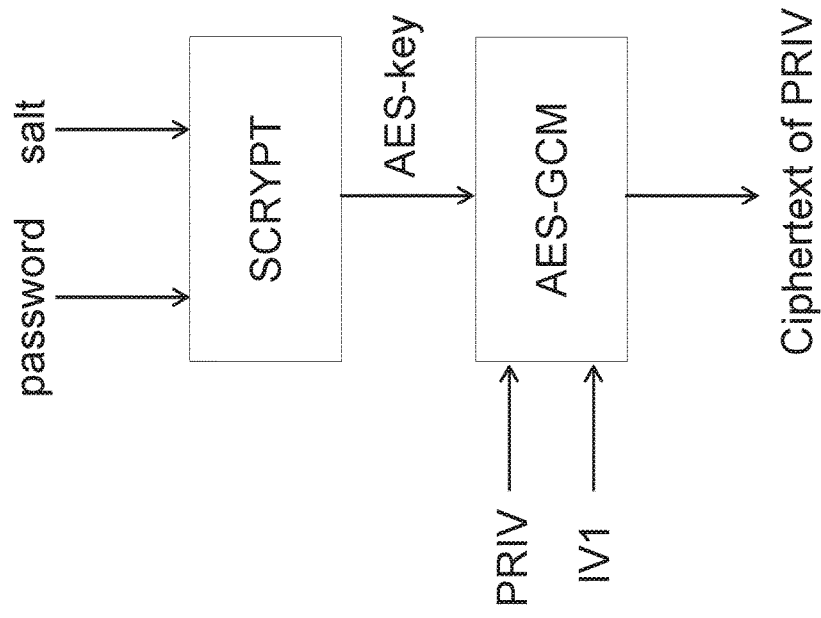
FIG. 2 illustrates an example of how to password protect a private key according to the present application.

FIG. 2 illustrates in more details how the private key is encrypted. SCRYPT is used to generate an AES key from the selected password. "Salt" is in this context random data that is used as an additional input to the one-way function that "hashes" the password. SCRYPT is in the illustrated example selected because it is a password-based key derivation function specifically designed to make it costly to perform large-scale custom hardware attacks by requiring large amounts of memory. It is generally designed to be computationally intensive, so that it takes a relatively long time to compute. However, setting up the system is only done occasionally, so the time required will still be negligible.

The AES key generated from the password as illustrated in FIG. 1 is then further used to perform the actual encryption of the private key (PRIV). This is done by an Advanced Encryption Standard (AES) algorithm in Galois/Counter Mode (AES-GSM). In addition to the private key, an Initialization Vector (IV1) is input to the AES-GCM, generating the ciphertext of PRIV which is stored in the ground control station.

Figure 3:
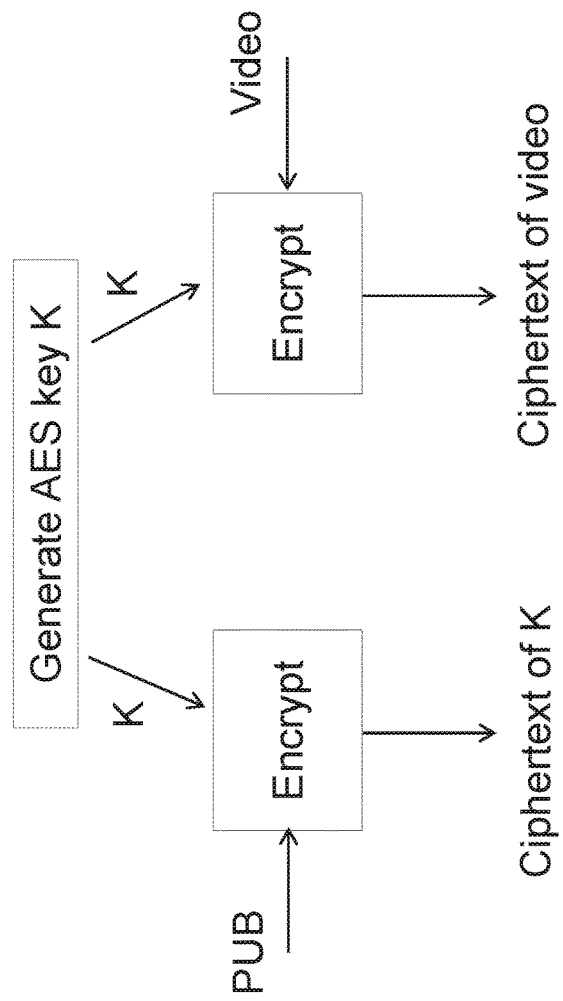
FIG. 3 illustrates an example of recording video according to the present application.

FIG. 3 illustrates how e.g. video captured by the UAV is encrypted during mission, i.e. in recording mode. First, a data encryption key K is generated. K is further used as a key to encrypt the video captured by the UAV. K itself is encrypted by the public key (PUB) generated in the above described process of setting up the system. Then the ciphertext of the captured video encrypted by K and the ciphertext of K encrypted by PUB will be stored in the ground control station.

FIG. 4 illustrates the decryption process when play backing the encrypted video stored on the ground control station. In this process, the password entered at the time when setting up the system is needed. SCRYPT is again used to generate the AES key from the entered password. The AES key is in turn used to decrypt the private key (PRIV) from the ciphertext of PRIV stored on the ground control station also at the time when setting up the system. The decrypted PRIV is further used to decrypt the ciphertext of K which was generated by encryption of K by PUB at the time the video was recorded. K is then used to decrypt the stored ciphertext video which was generated by encryption of the video by K at the time the video was recorded. The video is then available for playback on e.g. the ground control station screen.

The different processes in embodiments of the present application can be further summarized in the following general stepwise description:

Setting Password on the System:
1. Generate a public/private key pair (PUB/PRIV)
2. Password entered through user interface
3. Generate non secret parameters for input to key derivation function (KDF) (e.g. salt)
4. Password or other parameters used as input to KDF to derive an encryption key K
5. Use K to encrypt PRIV
6. Store the PUB, the ciphertext of PRIV and non-secret input parameters to KDF
7. Erase K and PRIV from the system memory Storing Encrypted Data to the System:
1. Generate a data encryption key DEK
2. Use the public key PUB to encrypt DEK, and store the ciphertext
3. Use DEK to encrypt the data, and store the data
4. Erase DEK from the system memory Accessing Encrypted Data:
1. Password entered through user interface
2. Read non-secret parameters for KDF from disk
3. Input password and parameters read in 2. to KDF to obtain key K
4. Read ciphertext of PRIV from disk and decrypt using K
5. Read ciphertext of DEK from disk and decrypt using PRIV
6. Read encrypted data from disk and decrypt using DEK
7. Once finished, erase DEK, PRIV, K and decrypted data from system memory It follows from the description of example embodiment of the present application above that the actual encryption and decryption of video is performed by the relatively low computational demanding symmetric cryptography, since the data encryption key K is used both for encryption and decryption.

However, a new K is generated for, and associated with, each respective video recording, but all Ks are encrypted and decrypted by the relatively high computational demanding asymmetric cryptography with the same public and private public key pair, which was generated in the setup of the system. The public key is stored in the ground control system as plain text, and the private key is stored as ciphertext, password protected and encrypted in the setup of the system.

Hence, recording of video will require no entry of the password thus making it possible for an instant UAV mission, but the video data will still be dual protected by encryption of both the video data itself and the data encryption key of which it is encrypted. Large amount of data, as video data tends to be, is encrypted and decrypted by symmetric cryptography, while low amount of data, as data encryption and decryption keys tend to be, is encrypted and decrypted by asymmetric cryptography.

The above description discloses different example embodiments for illustrative purposes. A person skilled in the art would realize a variety of different combinations of symbols, symbol designs all being within the scope of the embodiments.

It should be emphasized that the term "comprises/comprising" when used in this specification is taken to specify the presence of stated features, integers, steps, or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method of combining symmetric and asymmetric cryptography for recording and playing back a media data stream, performed by an unmanned aircraft system (UAS) comprising an unmanned aerial vehicle (UAV) and a UAV ground station, the method comprising:
   generating, by the UAV ground station, a public key (PUB) and a corresponding private key (PRIV);
   password protecting, by the UAV ground station, the private key (PRIV) by means of a password provided to the UAV ground station, wherein the password protecting comprises:
      generating a key based, at least in part, on the password;
      encrypting the private key (PRIV) using the key to obtain an encrypted private key;
      storing the encrypted private key within the UAV ground station; and
      erasing the private key (PRIV) from the UAV ground station;
   transmitting the public key (PUB) to the UAV;
   generating, by the UAV, a symmetric data encryption key;
   encrypting, by the UAV, the media data stream by means of the symmetric data encryption key, wherein the media data stream is generated by a media data capturing device of the UAV;
   encrypting, by the UAV, the symmetric data encryption key by means of the public key (PUB) provided by the UAV ground station to the UAV; and
   transmitting the encrypted symmetric data encryption key and/or the encrypted media data stream to the UAV ground station.

2. The method of claim 1, wherein the UAV ground station is configured to receive the password from an operator of the UAS.

3. The method of claim 1,
   wherein the key comprises an advanced encryption standard (AES) key generated based, at least in part, on the password, and
   wherein the private key (PRIV) is encrypted using the AES key and an AES algorithm in Galois/Counter Mode (AES-GSM).

4. The method of claim 2, further comprising:
   decrypting, by the UAV ground station, the encrypted private key by means of the password to obtain a decrypted private key;
   decrypting, by the UAV ground station, the encrypted symmetric data encryption key by means of the decrypted private key to obtain a decrypted symmetric data encryption key; and
   decrypting, by the UAV ground station, the encrypted media data stream by means of the decrypted symmetric data encryption key.

5. The method of claim 4, further comprising:
   erasing the symmetric data encryption key from the UAV after the transmitting the encrypted symmetric data encryption key and/or the encrypted media data stream to the UAV ground station;
   erasing the decrypted private key from the UAV ground station after the decrypting the encrypted symmetric data encryption key; and
   erasing the symmetric data encryption key from the UAV ground station after the decrypting the encrypted media data stream.

6. The method of claim 2, further comprising:
   decrypting, by the UAV ground station, the encrypted private key by means of the password to obtain a decrypted private key;
   decrypting, by the UAV ground station, the encrypted symmetric data encryption key by means of the decrypted private key to obtain a decrypted symmetric data encryption key; and
   decrypting, by the UAV ground station, the encrypted media data stream by means of the decrypted symmetric data encryption key.

7. The method of claim 6, wherein the decrypting the encrypted private key comprises:
   generating an advanced encryption standard (AES) key based, at least in part, on the password; and
   decrypting the encrypted private key using the AES key.

8. The method of claim 2, further comprising:
   decrypting, by the UAV ground station, the encrypted symmetric data encryption key by means of the private key (PRIV) to obtain a decrypted symmetric data encryption key;
   decrypting, by the UAV ground station, the encrypted media data stream by means of the decrypted symmetric data encryption key to obtain a decrypted media data stream; and
   playing back the decrypted media data stream for an operator of the UAS by means of a ground control station screen of the UAV ground station.

9. The method of claim 2, wherein the media data stream comprises a first media data stream and the symmetric data encryption key comprises a first symmetric data encryption key, the method further comprising:
   generating, by the UAV, a second symmetric data encryption key;
   encrypting, by the UAV, a second media data stream by means of the second symmetric data encryption key;

encrypting, by the UAV, the second symmetric data encryption key by means of the public key (PUB) provided by the UAV ground station to the UAV; and transmitting the encrypted second symmetric data encryption key and/or the encrypted second media data stream to the UAV ground station.

10. The method of claim 2, wherein:

the media data stream comprises an image data stream or a video data stream; and/or the media data capturing device comprises a camera or a video camera.

11. An unmanned aircraft system (UAS) comprising:

an unmanned aerial vehicle (UAV) comprising at least one media data capturing device configured to generate a media data stream; and a UAV ground station configured to communicate with the UAV over a communication link, wherein the UAV is configured to:

generate a symmetric data encryption key;

encrypt the media data stream generated by the media data capturing device by means of the symmetric data encryption key;

encrypt the symmetric data encryption key by means of a public key (PUB) provided by the UAV ground station to the UAV;

transmit the encrypted symmetric data encryption key and the encrypted media data stream to the UAV ground station; and erase the symmetric data encryption key from the UAV after transmitting the encrypted symmetric data encryption key and the encrypted media data stream to the UAV ground station.

12. The UAS of claim 11, wherein the UAV ground station is configured to:

generate the public key (PUB) and a corresponding private key (PRIV);

password protect the private key (PRIV) by means of a password provided by an operator of the UAS to the UAV ground station; and transmit the public key (PUB) to the UAV prior to the UAV generating the symmetric data encryption key.

13. The UAS of claim 12, wherein the password protecting the private key (PRIV) comprises:

generating, via an encryption device of the UAV ground station, an advanced encryption standard (AES) key based, at least in part, on the password provided by the operator to the UAV ground station;

encrypting, via the encryption device, the private key (PRIV) using the AES key and an AES algorithm in Galois/Counter Mode (AES-GSM);

storing the encrypted private key within the UAV ground station; and erasing the private key (PRIV) from the UAV ground station.

14. The UAS of claim 12, wherein the UAV ground station is configured to:

receive the encrypted symmetric data encryption key and the encrypted media data stream from the UAV;

decrypt, via a decryption device of the UAV ground station, the password protected private key by means of the password to obtain a decrypted private key;

decrypt, via the decryption device, the encrypted symmetric data encryption key by means of the decrypted private key to obtain a decrypted symmetric data encryption key; and decrypt, via the decryption device, the encrypted media data stream by means of the decrypted symmetric data encryption key.

15. The UAS of claim 14, wherein:

the UAV ground station is configured to:

erase the decrypted private key from the UAV ground station after decrypting the encrypted symmetric data encryption key; and erase the symmetric data encryption key from the UAV ground station after decrypting the encrypted media data stream.

16. The UAS of claim 11, wherein the UAV ground station is configured to:

decrypt a password protected private key (PRIV) corresponding to the public key (PUB) by means of a password provided by an operator of the UAS to the UAV ground station to obtain a decrypted private key;

decrypt the encrypted symmetric data encryption key by means of the decrypted private key to obtain a decrypted symmetric data encryption key; and decrypt the encrypted media data stream by means of the decrypted symmetric data encryption key.

17. An unmanned aircraft system (UAS) comprising:

an unmanned aerial vehicle (UAV) comprising at least one media data capturing device configured to generate a media data stream;

a UAV ground station configured to communicate with the UAV over a communication link, wherein the UAV is configured to:

generate a symmetric data encryption key;

encrypt the media data stream generated by the media data capturing device by means of the symmetric data encryption key; and encrypt the symmetric data encryption key by means of a public key provided by the UAV ground station to the UAV; and wherein the UAV ground station is configured to:

decrypt a password-protected private key corresponding to the public key by means of a password provided by an operator of the UAS to the UAV ground station to obtain a decrypted private key, wherein decrypting the password protected private key comprises:

generating an advanced encryption standard (AES) key based, at least in part, on the password; and decrypting the password-protected private key (PRIV) using the AES key to obtain the decrypted private key;

decrypt the encrypted symmetric data encryption key by means of the decrypted private key to obtain a decrypted symmetric data encryption key; and decrypt the encrypted media data stream by means of the decrypted symmetric data encryption key.

18. The UAS of claim 11, wherein:

the UAV is configured to transmit the encrypted symmetric data encryption key and/or the encrypted media data stream to the UAV ground station; and the UAV ground station is configured to:

decrypt the encrypted symmetric data encryption key by means of a private key (PRIV) corresponding to the public key (PUB) provided by the UAV ground station to the UAV to obtain a decrypted symmetric data encryption key;

decrypt the encrypted media data stream by means of the decrypted symmetric data encryption key to obtain a decrypted media data stream; and play back the decrypted media data stream for an operator of the UAS by means of a ground control station screen of the UAV ground station.

19. The UAS of claim 17, wherein the media data stream comprises a first media data stream and the symmetric data encryption key comprises a first symmetric data encryption key, and wherein the UAV is further configured to:
generate a second symmetric data encryption key;
encrypt a second media data stream by means of the second symmetric data encryption key;
encrypt the second symmetric data encryption key by means of the public key provided by the UAV ground station to the UAV; and
transmit the encrypted second symmetric data encryption key and/or the encrypted second media data stream to the UAV ground station.

20. The UAS of claim 17, wherein:
the media data stream comprises an image data stream or a video data stream; and/or
the media data capturing device comprises a camera or a video camera.

* * * * *

UNITED STATES PATENT AND TRADEMARK OFFICE
CERTIFICATE OF CORRECTION

PATENT NO. : 11,677,544 B2
APPLICATION NO. : 16/846242
DATED : June 13, 2023
INVENTOR(S) : Gjert Binz Vallevik, Martin Korsgaard and Torgeir Grothe Lien It is certified that error appears in the above-identified patent and that said Letters Patent is hereby corrected as shown below:

In the Claims

Claim 4, Column 6, Line 8, change "The method of claim 2," to --The method of claim 1,--.

Claim 6, Column 6, Line 31, change "The method of claim 2," to --The method of claim 1,--.

Claim 8, Column 6, Line 48, change "The method of claim 2," to --The method of claim 1,--.

Claim 9, Column 6, Line 60, change "The method of claim 2," to --The method of claim 1,--.

Claim 10, Column 7, Line 7, change "The method of claim 2," to --The method of claim 1,--.

Signed and Sealed this
Fifteenth Day of August, 2023

Katherine Kelly Vidal
*Director of the United States Patent and Trademark Office*